United States Patent
Savov

(10) Patent No.: US 7,350,197 B2
(45) Date of Patent: Mar. 25, 2008

(54) METHOD AND APPARATUS FOR OBJECT-TO-OBJECT JAVA NATIVE INTERFACE MAPPING

(75) Inventor: Andrey I. Savov, Laguna Hills, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 742 days.

(21) Appl. No.: 10/750,441

(22) Filed: Dec. 31, 2003

(65) Prior Publication Data

US 2005/0044540 A1     Feb. 24, 2005

Related U.S. Application Data

(60) Provisional application No. 60/496,253, filed on Aug. 19, 2003.

(51) Int. Cl.
    *G06F 9/45*     (2006.01)

(52) U.S. Cl. .................................. 717/137; 717/139
(58) Field of Classification Search ............... None
    See application file for complete search history.

(56) References Cited

U.S. PATENT DOCUMENTS

| 6,066,181 A * | 5/2000 | DeMaster ............. 717/148 |
| 2002/0056019 A1 * | 5/2002 | Kolodner et al. ......... 711/6 |

* cited by examiner

*Primary Examiner*—Tuan Dam
*Assistant Examiner*—Chuck Kendall
(74) *Attorney, Agent, or Firm*—Tucker Ellis & West LLP

(57) ABSTRACT

This invention is directed to a method and apparatus for implementing native code directly in C++ with object structure very closely resembling the object structure of JAVA. The method provides for the mapping of JAVA to C++ objects and invoking the JAVA Native Interface, mapping C++ objects to JAVA and returning a corresponding JAVA object, retrieving and returning a class factory by class name, and collecting garbage in both the C++ and JAVA environments.

28 Claims, 6 Drawing Sheets

Java to C++ map

C++ to Java map

Map Java to C++ and Invoke Method

Map C++ Object to Java and Return It

Retrieve and Return Class Factory

Collect Garbage

METHOD AND APPARATUS FOR OBJECT-TO-OBJECT JAVA NATIVE INTERFACE MAPPING

CROSS-REFERENCE TO RELATED APPLICATIONS

This application claims priority to U.S. Provisional Application No. 60/496,253, filed Aug. 19, 2003.

BACKGROUND OF THE INVENTION

This invention is directed to a method and apparatus for object-to-object JAVA Native interfacing. More particularly, the present invention is directed to a method and apparatus for facilitating the direct implementation of native or legacy code in the JAVA runtime environment.

Virtual machines and particularly managed code executing within them are becoming increasingly popular due to several important benefits they provide: platform independence, execution stability and availability of development tools. Managed code is that code of a program that executes in a virtual machine environment and specifically has its memory allocation managed by that virtual machine.

However, no matter how lucrative rewriting all existing applications in managed code sounds, it is a most impractical undertaking. At the very least, rewriting must happen gradually in iterations, thereby being more cost effective and manageable.

The question that then arises is one of how to interface with legacy applications with significant importance to any managed code application. One of the difficulties architects of virtual machines have to overcome is how to enable communication between the virtual machines and the existing applications that run outside that environment.

Although virtual machines are of a quite old computing concept, it wasn't until recently that commercial vendors were able to actually construct machines that are commercially viable and contain the runtime capabilities to scale as needed. Sun Microsystems and their JAVA platform are considered to be the first such vendor and environment, e.g., Sun JAVA 2 Native Interface.

JAVA Native Interface or JNI, is designed with the objective of being generic enough that it enables JAVA applications to invoke any native code without regard to the native code's programming language. This rationale, for example, led to the tools provided for in JNI bridge development producing C language functions, which is by far the most generic and native-friendly programming language.

In JAVA programming, an object is a software bundle of related variables and methods. Software objects all have state and behavior. Each software object maintains its state in one or more variables. A variable is an item of data named by an identifier. A software object implements its behavior with methods, whereas a method is a function (subroutine) associated with an object. To clarify, everything that a software object knows (state) and can do (behavior) is expressed by the variables and methods within that object. Variables, formally known as instance variables, contain the state for a particular object. Instance methods inspect or change the state of a particular instance.

An object's variables make up the center, or nucleus, of the object. Methods surround and hide the object's nucleus from other objects in the program. Encapsulation is used to define the packaging of an object's variables within the protective custody of its methods. In JAVA, an object can specify one of four different access levels for each of its variables and methods. These levels determine which other objects and classes may access that particular variable or method. A class is a blueprint, or prototype that defines the variables and methods common to all objects of a certain kind, thus, an object is typically an instance of some class. To state another way, a class consists of a group of related methods and variables lumped together under one name.

In C++, objects are normally identified by their address (pointer). This address, if used improperly, can cause severe and hard-to-find damage to the program. Examples of such improper usage are double-free, stale pointers usage, and the like. The "smart pointer", or object reference management, replaces the object pointer with an object reference, a separate lightweight object which is managed independently from the object, much like object references in JAVA. Class Loaders use these pointers to locate the corresponding class file on disk, read the file into RAM and call java.lang.ClassLoader.defineClass, which tells the system to treat the RAM image as legitimate byte codes.

Some object-oriented languages require that a programmer keep track of all the objects the programmer creates and to explicitly destroy them when they are no longer needed. Managing memory explicitly is tedious and error prone. The JAVA platform uses garbage collection, which allows programmers to create as many objects as desired (limited, of course, by what the user's system can handle), and without worrying about destroying them. The JAVA runtime environment deletes objects when it determines that they are no longer being used.

When there are no more references to a particular object, that object is eligible for garbage collection. References that are held in a variable are usually dropped when the variable goes out of scope. Or, a programmer or user may explicitly drop an object reference by setting the variable to the special value null. A program may have multiple references to the same object; all references to an object must be dropped before the object is eligible for garbage collection. The JAVA runtime environment has a garbage collector that periodically frees the memory used by objects that are no longer referenced.

The majority of legacy code or code that JAVA must communicate with is actually written in C++ or some other object-oriented language. By its nature, C++ is very close concept-wise to JAVA. Both object-oriented languages use classes, objects, native class factories, and the like. In point of fact, C++ and JAVA are so close that they share common language constructs such as keywords, syntax, etc. However, JNI provides only C language binding and lacks the binding required for the C++ language.

Thus there is a need for a method and apparatus to bridge the gap between the JAVA object world and the world of C++ objects.

SUMMARY OF THE INVENTION

In accordance with the present invention, there is provided a method and apparatus for implementing native code directly in C++ with object structure very closely resembling object structure of JAVA. The method provides for mapping JAVA objects to C++ objects through the JAVA Native Interface without interfering with the object model, performance, or other characteristics of the implementation. The present invention also includes a configurable C++ garbage collector that compensates for JAVA garbage collection deficiencies.

Further in accordance with the present invention, there is provided a method for mapping a JAVA object to a C++ object, the steps comprising retrieving a value for a jobject. Next, a determination of the value of the jobject is made, where a nonzero value indicates a valid C++ object pointer and a zero value indicates that the jobject has not yet passed into the C++ boundary. The jobject instance is used to acquire the JAVA class name of the jobject. The class name is passed to a class loader and asked to return a corresponding class factory. Initializing the class factory and instantiating a native side object corresponding to the original jobject received. Finally, the C++ object type and method are resolved at compile time using a JNI wrapper routine.

Still further in accordance with the present invention, there is provided a method for mapping a C++ object to a JAVA object, comprising the steps of returning a reference to a C++ object as a smart pointer. Next, the smart pointer is queried for an object ID, or key. The key is compared with an existing map to determine whether or not the key needs to be created. A value in the map that corresponds to the key is retrieve and is in the form of a jobject. The jobject ID is then returned.

Still yet further in accordance with the present invention, there is provided a method for retrieving and returning a class factory by class name, comprising the steps of receiving a request for a managed class name, mapping the class name into native class name and determining if the class factory is loaded. The class loader loads the executable module containing the factory and retrieves the class factory interface contract by calling a pre-agreed module binding point.

Further in accordance with the present invention, there is provided a method for collecting native side garbage, the steps comprising awakening a garbage collector, iterating an object map for weak references, collecting native side smart pointers, and decreasing the reference count of the native side object referred to by the smart pointer, wherein all native side objects that have their corresponding JAVA side counterparts out-of-scope are removed.

Still other advantages and aspects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects—all without limitation from the invention. Accordingly, the drawing and descriptions will be regarded as illustrative in nature and not as restrictive.

DETAILED DESCRIPTION OF INVENTION

The present invention is directed to an apparatus and method for providing a natural map for movement of objects from one language to another. More particularly, the present invention is directed to a method and apparatus for mapping object-to-object using the JAVA Native Interface.

In object-oriented programming, an object is a software bundle of related variables and methods. The present invention functions upon the interaction of three components, an object map, a class loader and a garbage collector. The object map quickly and inexpensively maps objects from the native side to the managed side. In the preferred embodiment, discussed infra, the map is a Standard Template Library map implemented as N-ary trees. The object map of the present invention has a key, which is the native object ID (in C++ parlance, this is the object pointer) and a value, which is the managed side object ID (in JAVA Native Interface parlance, this is the jobject).

The class loader component is responsible to identify and load for execution the native class factory responsible to instantiate objects of that particular class. In the preferred embodiment discussed below, this loading is done on demand, that is, whenever an object of a particular class "crosses" from the managed side into the native side for the first time. In other words, the first time the class loader is asked to instantiate a native side object and the corresponding class factory is not loaded, it will load the executable module, perform any class initialization, and only then ask that class factory to instantiate the object. The class loader may decide to unload class factories based on criteria inherent to the implementation of the class loader. This will be appreciated by those skilled in the art as standard techniques to the JAVA programming language. In the preferred embodiment, class factories are never unloaded and will only cease to exist upon system termination, i.e., shutdown. Alternative methods, readily apparent to one skilled in the art, may be used for loading and unloading the class factories. Such methods include, but need not be limited to, loading in the background thread, loading related class factories, unloading after a period of inactivity, unloading the Least Recently Used factories, and unloading the Least Frequently Used factories.

The garbage collector disposes the references to native side objects when their managed side counterparts go out of scope. That is, the garbage collector removes pointers to native side objects when the managed side counterparts are removed during the normal garbage collection process inherent to JAVA programming. In the preferred embodiment, the garbage collector will activate to clean memory every five (5) seconds.

Figure 1:
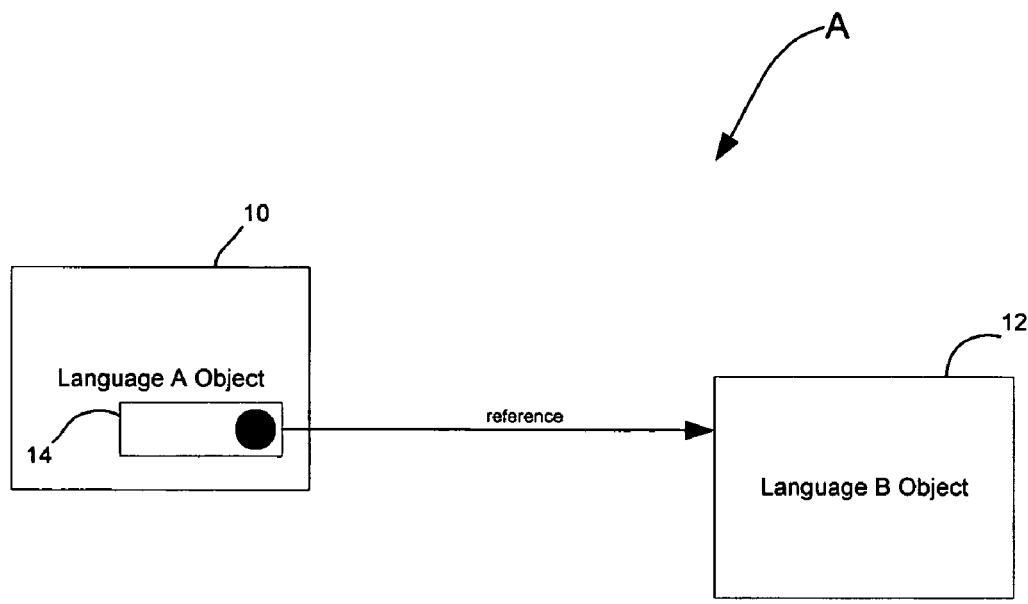
FIG. 1 is a block diagram illustrating the maintaining of an object reference within the instance data of another object.
Figure 2:
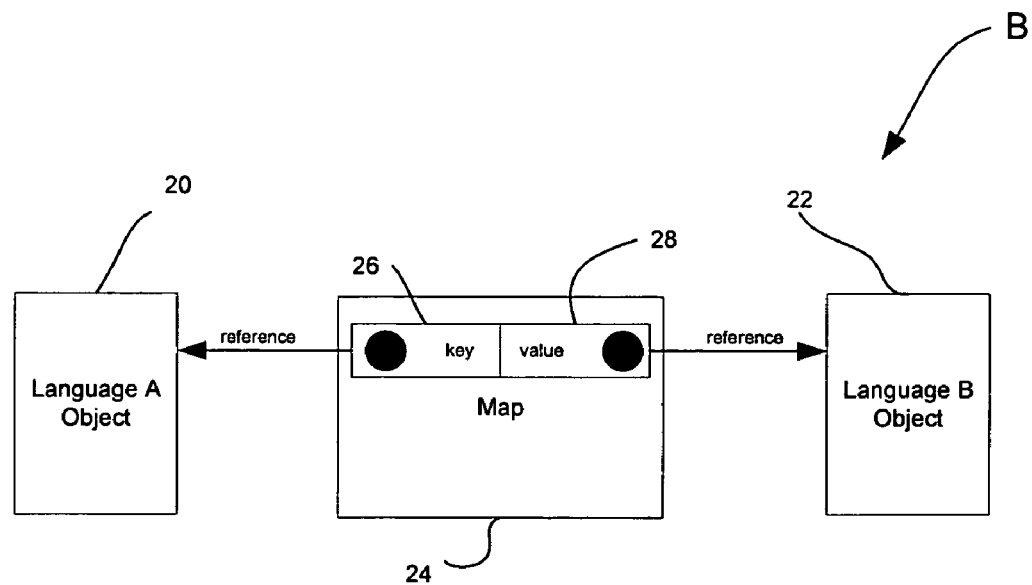
FIG. 2 is a block diagram illustrating the maintaining of a map from an object reference of one type of object to another type of object.

Turning to FIG. 1, there is shown a simple block diagram of maintaining an object reference 14 within the instance data of a language A object 10. FIG. 1 shows objects from two separate programming languages, with language A being a managed side language and language B representing a native side language. Object 10 is written in Language A and is denoted as having an internal object reference 14. The object reference 14 exists within language A object 10 and acts as a pointer to the corresponding language B object 12. That is, the internal object reference 10 contains an object ID of the language B object 12. FIG. 2 exemplifies maintaining a map from object reference of one type to another type. Turning to FIG. 2 there is shown a language A object 20, a language B object 22 and a map 24. As shown in FIG. 2, the map 24 contains a key 26 and a value 28. The key 26 denotes a native object identification, whereas the value 28 denotes the managed side object identification. In operation, the map 24 contains a plurality of keys and their corresponding values. This enables the map 24 to facilitate the translation from programming language A to programming language B.

Figure 3:
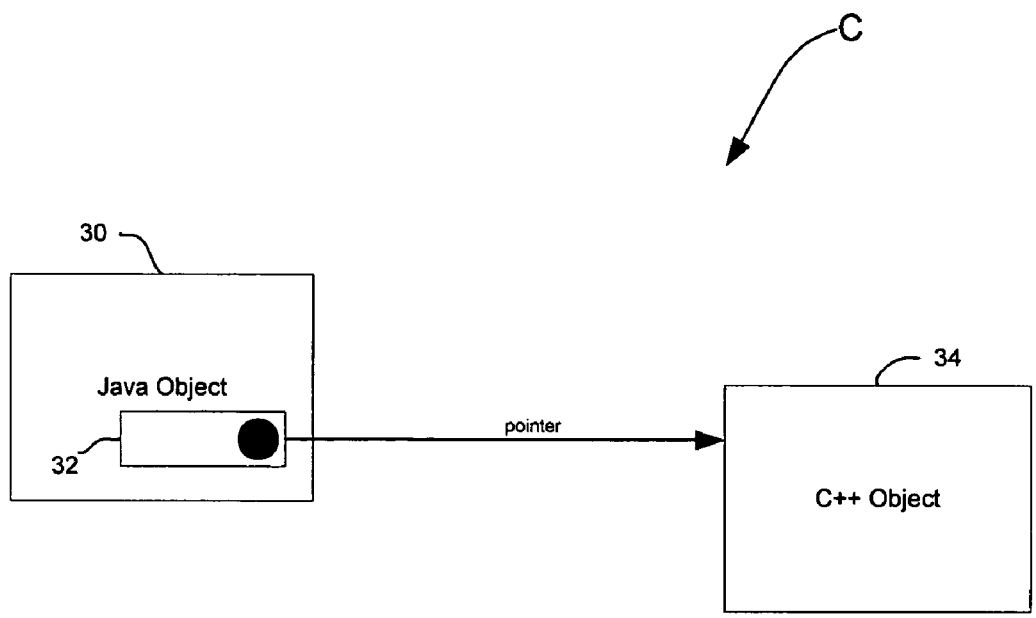
FIG. 3 is a block diagram illustrating the illustrating the maintaining of an object reference of a C++ object within the instance data of a JAVA object.

Turning to FIG. 3, there is shown a map C for translating from a JAVA object 30 to a C++ object 34. While FIG. 3 denotes JAVA and C++, it will be appreciated by one skilled in the art that the map C may be applied to other object oriented programming languages. The JAVA, or managed side, object 30 is given in the form of an instance of jobject type. Integral to the JAVA object 30 is a pointer 32, which comprises a variable having a predefined value. When the value of this variable is non-zero, it is interpreted as a valid C++ object pointer 32. This allows the JAVA object 30, through the JAVA Native Interface (JNI) to invoke the method contained in the C++ object 34.

Figure 4:
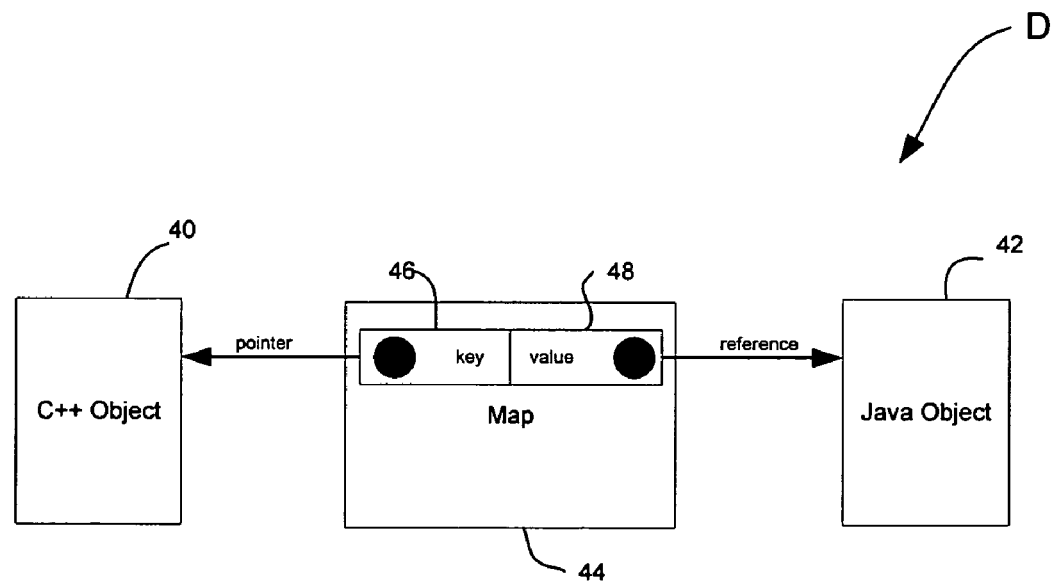
FIG. 4 is a block diagram illustrating the maintaining of a map from an object reference of a JAVA type object to a C++ type object.

FIG. 4 shows the map for translating from C++ to JAVA, or rather, the map required for a C++ program to invoke a method or retrieve a variable existing in a JAVA program. The map 44 contains a key 46 and a corresponding value 48. It will be appreciated by one of ordinary skill in the art that while only a single key 46 and a single value 48 are shown, the method contemplated herein is applicable to a plurality of keys and corresponding values. The use of a single key 46 and a single value 48 are for exemplification purposes only. Returning to FIG. 4, there are a C++ object 40 and a JAVA object 42. To facilitate the translation from C++ to JAVA, the map 44 utilizes the native object ID (C++ object pointer as key 46) and the managed side object ID (JNI jobject or value 48). As each key 46 only points to a single C++ object 40 and each value 48 denotes a single JAVA object 42, the map is able to translate between the two programming languages.

When the JAVA object 42 invokes a method or variable existing in a legacy program, such as the method or variables contained in the C++ object 40, a value 48 is registered by the map 44. The map 44 queries the stored keys to determine which key, if any, corresponds to the value 48 of the JAVA object 42. Once the map 44 determines that key 46 corresponds to value 48, the map activates key 46. The key 46 points to the C++ object 40, whereby the method or variable sought by the JAVA object 42 is retrieved.

Figure 5:
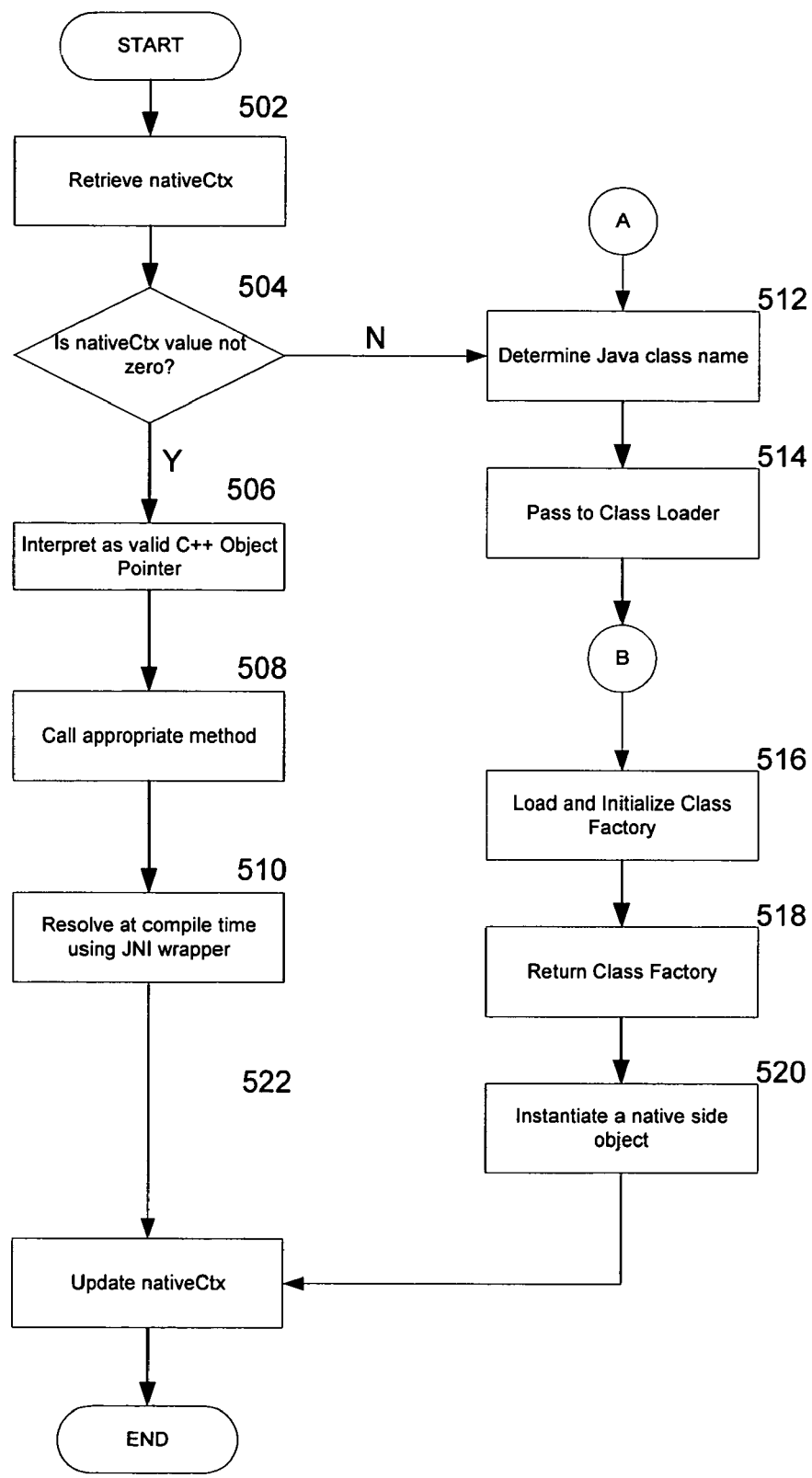
FIG. 5 is a flow chart depicting the mapping of JAVA to C++ and invocation of a method.

The foregoing simplistic description is intended to provide an overview of the method and apparatus as is now going to be exemplified with references to the remaining figures. Turning to FIG. 5, there is shown a flow chart depicting the operation of the present invention as it translates, or maps, JAVA objects to C++ objects and invokes the methods contained therein. It will be appreciated that the use of JAVA and C++ are for purposes of explanation only and should not be construed as to limit the method solely to either JAVA or C++ translations. One of skill in the art will appreciate that the method described hereinafter, while denoting JAVA and C++, may be applied to any object-to-object oriented languages.

A JAVA, or managed, side object is given in the form of an instance of jobject type. This instance is used to resolve a predefined JAVA object member variable, nativeCtx. Beginning at 502, using JNI calls, the value of nativeCtx is retrieved. The means for retrieval using JNI calls are well known in the art and one of appreciable skill will understand its use herein. The method progresses to a determination step at 504, in that the value of nativeCtx must be determined. For example, a zero value denotes that the class in which nativeCtx belongs has not before been encountered. A non-zero value denotes that the value retrieved in 502 represents a valid C++ object pointer. A determination in step 504 that a non-zero value was retrieved in 502 progresses the method to step 506, where the value is interpreted as a valid C++ object pointer. At step 508, the valid C++ object pointer is used to call the corresponding method, i.e., the C++ object to which it refers. At step 510, the C++ object type and method name are resolved at compile time through the use of the appropriate JNI wrapper routine. The method proceeds to step 522, where the value of nativeCtx is updated to reflect an active reference, inhibiting the removal of the value during garbage collection.

Returning to step 504, when the value of nativeCtx is determined to be zero, the JAVA object has not yet passed to the native (C++) side. In the case, the jobject instance is used to determine the JAVA class name of the object at 512. The class name, so determined, is then passed to the class loader at 514, which is asked to return the corresponding class factory. The class loader, as shown at 516, may load and initialize the class factory before returning it. One of ordinary skill in the art will recognize that the initializing of the class factory may occur subsequent to the return of the class factory. The loaded and initialized class factory is then returned to the program at step 518. At 520, the native side object is instantiated into a native side object, i.e., the original JAVA jobject has been translated into a corresponding C++ object. The value of nativeCtx is then updated at step 522. It will be appreciated by those skilled in the art that the updating of the value of nativeCtx equates to using JNI methods to contain the C++ object pointer in the JAVA object. Thus, the program has mapped JAVA to a C++ object and invoked the JNI method of the present invention.

Figure 6:
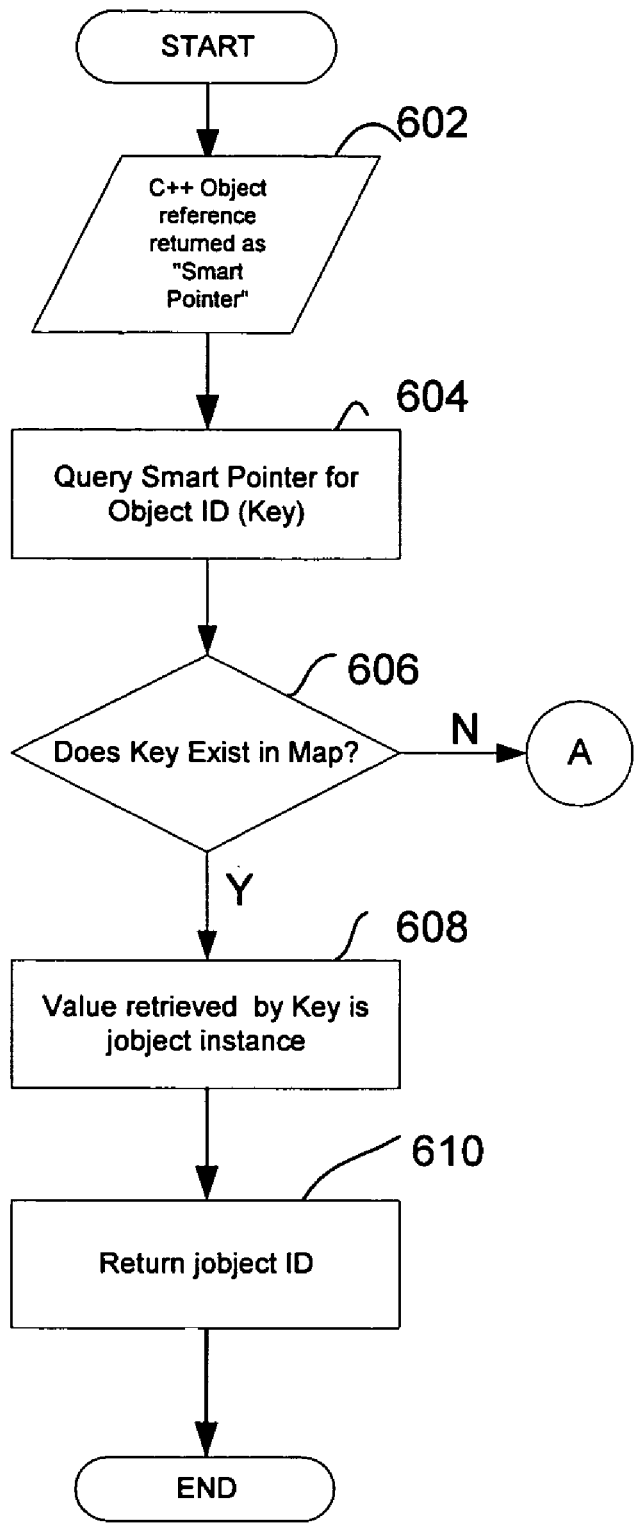
FIG. 6 is a flow chart depicting the mapping of C++ to JAVA and the returning of an object ID.

The mapping of a C++ object to JAVA and returning the object is exemplified in the flow chart of FIG. 6. A C++ object reference is returned to the program at step 602 in the form of a "smart pointer". The smart pointer is an object reference management tool, which replaces the normal C++ object pointer with an object reference. The lightweight object reference that is the smart pointer is then queried at step 604 for the ID of the object ID to which it refers. That is, the smart pointer is asked to divulge the C++ object pointer to which it refers.

Having thus retrieved the key at 604, the program progresses to determine that the key exists in the map at 606. In the event that the key does not exist in the map, the program will return to step 512 and progress from there. Returning to a positive determination in step 606, the value corresponding to the key is retrieved at 608, thereby giving the program the jobject instance. The jobject ID is then returned at 610. Thus, the C++ object has been mapped to JAVA and returned.

The foregoing direct implementation of native C++ code, depicted in FIGS. 5 and 6, allows for the C++ code to have a structure very closely resembling the inherent JAVA structure. This type of implementation is suitable for Application Programmer Interface (API) bindings, where the implementation is entirely accomplished on the C++ native side and the JAVA side is merely a binding (wrapper) to the API.

Figure 7:
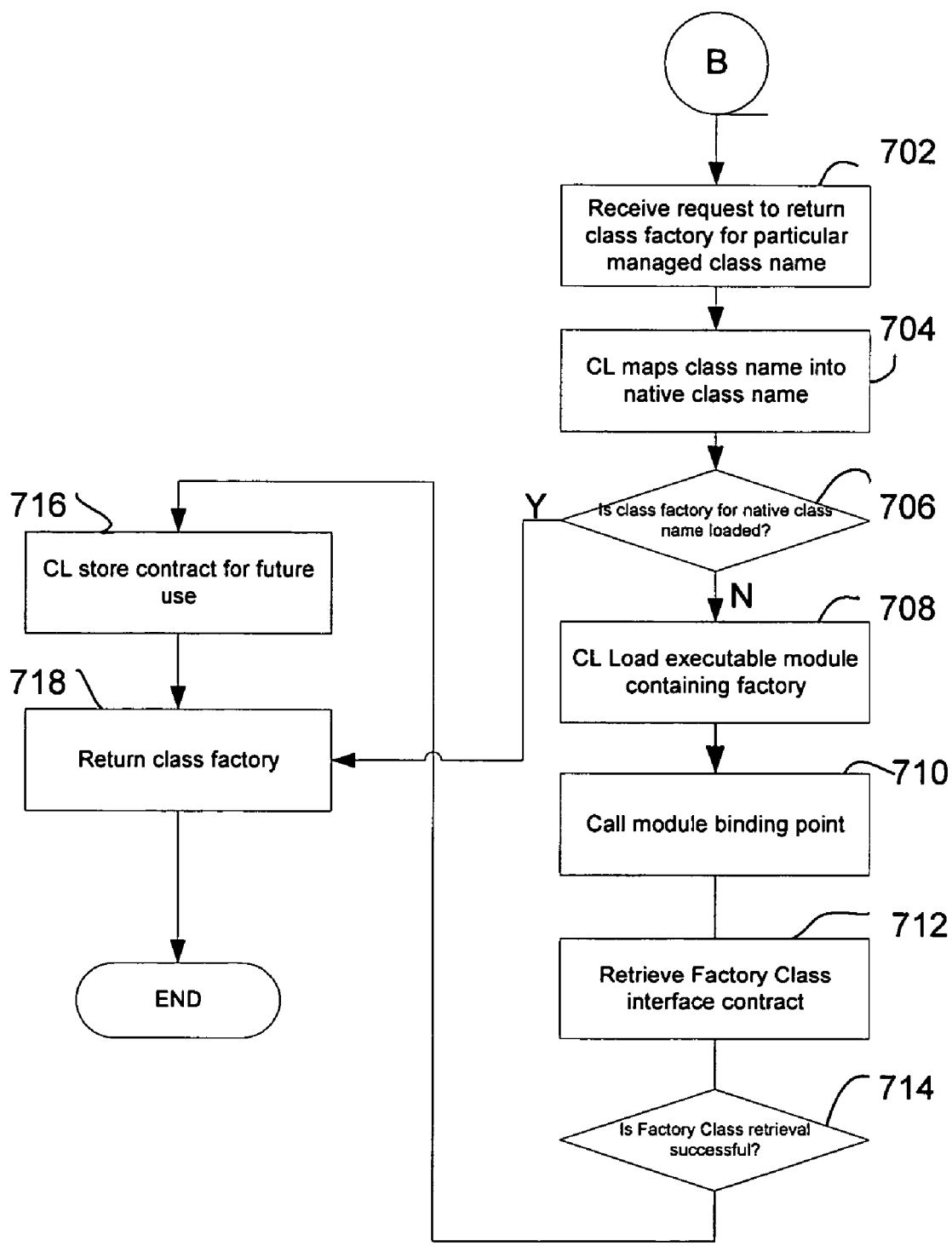
FIG. 7 is a flow chart depicting the retrieval and returning of a class factory by class name.

Returning first to FIG. 5, at step 514, the class name has been sent to the class loader for retrieval of the corresponding class factory. Thus the class loader has been asked to return a class factory for a particular managed (JAVA) class name (the class name being based upon the jobject type). Turning now to FIG. 7, there is shown a flow chart for the method by which the class loader retrieves and returns the information requested. The class loader receives the request to return a class factory for a particular managed (JAVA) class name at step 702. The class loader then maps the managed (JAVA) class name into a native (C++) class name at step 704. It will be understood by those skilled in the art that the class loader of the present invention may be utilized in any object-to-object program, as object-oriented programming utilizes the class layout/function. The class loader must then determine, at 706, if the class factory corresponding to the native class name mapped in 704, has already been loaded. In the event that the corresponding class factory has previously been loaded, the class loader then returns the class factory to the program at 718.

In the event that the class loader determines the needed class factory has not yet been loaded at step 706, the class loader loads an executable module containing the class factory at step 708. The class loader then calls a pre-agreed upon module binding point at 710 in order to retrieve a class factory interface contract at 712. If it is determined at 714 that the retrieval was unsuccessful, the class loader returns to 708 and attempts to again load the executable module containing the class factory. A successful retrieval determined at 714 progresses the method to step 716, where the class loader stores a reference and/or the contract for future use. The class factory so retrieved is then returned at step 718.

The C++ class factories can thereby be loaded on demand whenever instances of particular classes are required or whenever the JAVA class loader loads the particular package. This is particularly useful for the more modular structure of C++ code, which is dynamically loaded only when required. Thus, the program has retrieved and returned a class factory by using a class name.

Figure 8:
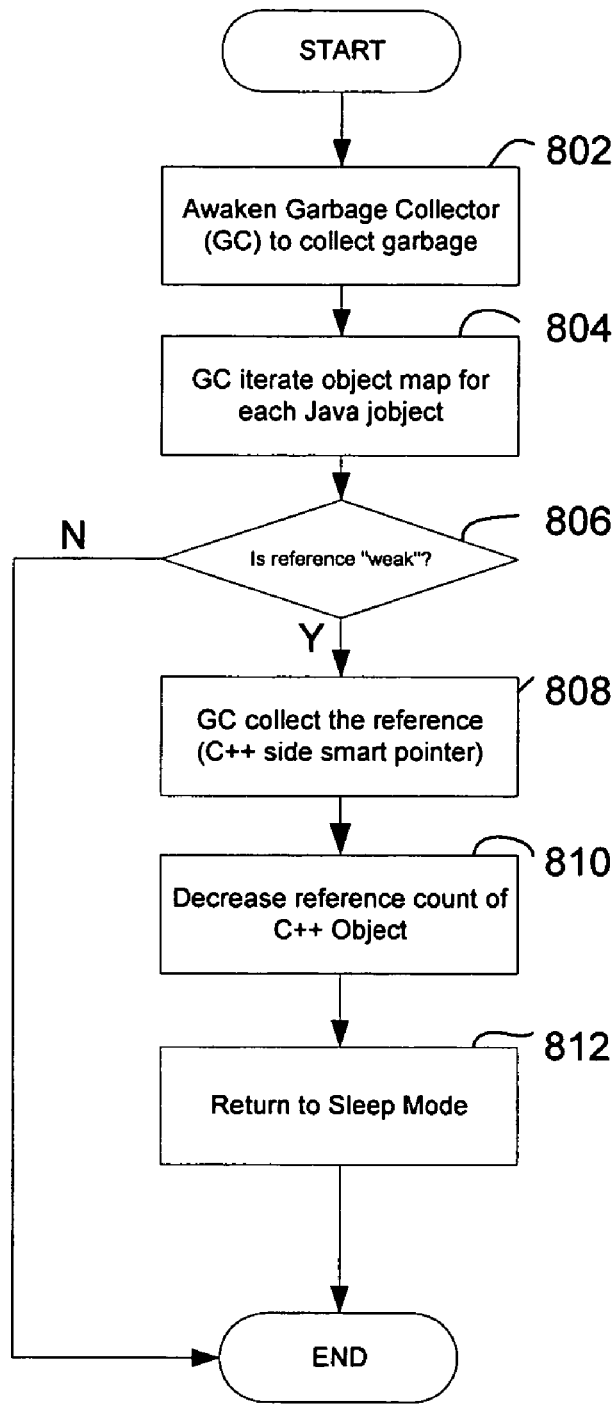
FIG. 8 is a flow chart depicting the disposal of unused references of the garbage collector.

Inherent to the JAVA programming language, a garbage collection occurs to remove unused objects and improve memory utilization. However, the present invention furthermore provides a native-side garbage collector, or simply garbage collector, which collects the C++ references. That is, when a JAVA object is removed from under-utilization, the corresponding C++ smart pointer is also collected and removed. Turning now to FIG. 8, there is shown a flow chart for the operation of the garbage collector of the present invention. The process for collecting the unused objects and references begins at 802 when the garbage collector awakens. It will be appreciated by those skilled in the art that JAVA allows for the manual activation, as well as the automatic activation, of the garbage collector. In this, the preferred embodiment, the garbage collector is set to activate every five (5) seconds to dispose of unused items. The garbage collector starts in step 804 to iterate the object map for each JAVA jobject. Upon completion in step 804, the garbage collector must then determine at step 806, if each reference is or is not weak. Weak is a JAVA term-of-art for an out-of-scope or not used object or reference. A non-weak reference will be left alone. In the event that the garbage collector finds a weak reference, it will collect the native-side reference at step 808. For purposes herein, the reference so collected is a C++ smart pointer. The smart pointer, or reference, is then disposed of resulting in step 810 of a decrease in the reference count of the C++ object. This decrease may eventually lead to the removal of the C++ object itself, if the reference count drops to zero.

The end result of the garbage collection is the removal and disposal of all C++ objects that have had their JAVA side counterparts go out-of-scope. The JAVA garbage collector may still not collect the reference at this time, however, the native resources (C++ objects) associated with it are released. The "nativeCtx" example is never updated, since JAVA references are never re-promoted to active. After completing the collection and disposal process, the garbage collector will proceed to step 812 and "sleep" until it is activated again in five (5) seconds.

Consequently, memory allocated by the native side is managed separately from the memory allocated from the JAVA (managed) side. Since JAVA garbage collection is notoriously conservative, the net result is a sizeable improvement in memory utilization.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by the those skilled in the area within the principle and scope of the invention as will be expressed in the appended claims and equivalents.

What is claimed is:

1. A system for object-to-object mapping between an operating environment and native processor language comprising:

a memory, the memory including a first memory portion storing an application inclusive of at least one application side object description, which at least one object description is compatible computer language associated with the application, wherein each application side object includes associated application side identification data;

a second memory portion of the memory, the second memory portion storing executable code in a format native to a selected processor, which executable code includes at least one native side object description, wherein each native side object description includes associated native side identification data;

an object map means adapted for mapping between the at least one application side object description and the native side object description, the object map including means adapted for associating application side identification data with native side identification data;

a class identifier for identifying a class associated with the at least one application side object description and the at least one native side object description;

testing means adapted for testing the object map to determine whether a particular pointer is associated with a key data component;

mapping means for mapping between a selected application side object description and a selected native side object description in accordance with an output of the testing means;

means adapted for generating updated key data in accordance with an output of the mapping means;

a class loader for loading a native class factory for instantiation of objects associated with an identified class; and means adapted for completing access to an object via the object map without translation between the application side and the native side.

2. The system for object-to-object mapping between an operating environment and native processor language of claim 1, further comprising:
    means adapted for determining a presence of the at least one application side object; and
    means adapted for initiating the class loader in accordance with a determined presence of the at least one application side object.

3. The system for object-to-object mapping between an operating environment and native processor language of claim 2, further comprising:
    class factory testing means adapted for testing whether a class factory is still required after a load thereof; and
    means adapted for selectively unloading a native class factory in accordance with an output of the class factory testing means.

4. The system for object-to-object mapping between an operating environment and native processor language of claim 2, further comprising:
    object testing means adapted for testing whether a native side object description is out of a pre-selected scope; and
    garbage collection means adapted for removing references to a native side object in accordance with an output of the object testing means.

5. The system for object-to-object mapping between an operating environment and native processor language of claim 4 further comprising means adapted for periodically enabling operation of the garbage collection means.

6. The system for object-to-object mapping between an operating environment and native processor language of claim 5 wherein the means for periodically enabling operation of the garbage collection means is periodically enabled on a pre-selected iteration.

7. The system for object-to-object mapping between an operating environment and native processor language of claim 3 wherein the associated native side identification data includes an object pointer.

8. A method for object-to-object mapping between an operating environment and native processor language comprising the steps of:
    storing, in a first memory portion of a memory, an application inclusive of at least one application side object description, which at least one object description is compatible computer language associated with the application, wherein each application side object includes associated application side identification data;
    storing, in a second memory portion of the memory, executable code in a format native to a selected processor, which executable code includes at least one native side object description, wherein each native side object description includes associated native side identification data;
    mapping, by means of an object map, between the at least one application side object description and the native side object description, the object map including means adapted for associating application side identification data with native side identification data;
    identifying a class associated with the at least one application side object description and the at least one native side object description;
    testing the object map to determine whether a particular pointer is associated with a key data component;
    mapping between a selected application side object description and a selected native side object description in accordance with an output of the testing means;
    generating updated key data in accordance with an output of the mapping means;
    loading a native class factory for instantiation of objects associated with an identified class; and
    completing access to an object via the object map without translation between the application side and the native side.

9. The method for object-to-object mapping between an operating environment and native processor language of claim 8, further comprising the steps of:
    determining a presence of the at least one application side object; and
    initiating the class loader in accordance with a determined presence of the at least one application side object.

10. The method for object-to-object mapping between an operating environment and native processor language of claim 9, further comprising the steps of:
    testing whether a class factory is still required after a load thereof; and
    selectively unloading a native class factory in accordance with an output of the testing.

11. The method for object-to-object mapping between an operating environment and native processor language of claim 9, further comprising the steps of:
    testing whether a native side object description is out of a pre-selected scope; and
    removing, by means of a garbage collection means, references to a native side object in accordance with an output of the testing.

12. The method for object-to-object mapping between an operating environment and native processor language of claim 11 further comprising the step of periodically enabling operation of the garbage collection means.

13. The method for object-to-object mapping between an operating environment and native processor language of claim 12 wherein the step of periodically enabling operation of the garbage collection means is periodically enabled on a pre-selected iteration.

14. The method for object-to-object mapping between an operating environment and native processor language of claim 10 wherein the associated native side identification data includes an object pointer.

15. A computer readable medium of instructions for object-to-object mapping between an operating environment and native processor language comprising:
    a memory, the memory including of first memory portion storing an application inclusive of at least one application side object description, which at least one object description is compatible computer language associated with the application, wherein each application side object includes associated application side identification data;
    a second memory portion of the memory, the second memory portion storing executable code in a format native to a selected processor, which executable code includes at least one native side object description, wherein each native side object description includes associated native side identification data;
    an object map means adapted for mapping between the at least one application side object description and the native side object description, the object map including means adapted for associating application side identification data with native side identification data;
    a class identifier for identifying a class associated with the at least one application side object description and the at least one native side object description;

testing means adapted for testing the object map to determine whether a particular pointer is associated with a key data component;

mapping means adapted for mapping between a selected application side object description and a selected native side object description in accordance with an output of the testing means;

means adapted for generating updated key data in accordance with an output of the mapping means;

a class loader for loading a native class factory for instantiation of objects associated with an identified class; and means adapted for completing access to an object via the object map without translation between the application side and the native side.

16. The computer readable medium of instructions for object-to-object mapping between an operating environment and native processor language of claim 15, further comprising:

means adapted for determining a presence of the at least one application side object; and means adapted for initiating the class loader in accordance with a determined presence of the at least one application side object.

17. The computer readable medium of instructions for object-to-object mapping between an operating environment and native processor language of claim 16, further comprising:

class factory testing means adapted for testing whether a class factory is still required after a load thereof; and means adapted for selectively unloading a native class factory in accordance with an output of the class factory testing means.

18. The computer readable medium of instructions for object-to-object mapping between an operating environment and native processor language of claim 16, further comprising:

object testing means adapted for testing whether a native side object description is out of a pre-selected scope; and garbage collection means adapted for removing references to a native side object in accordance with an output of the object testing means.

19. The computer readable medium of instructions for object-to-object mapping between an operating environment and native processor language of claim 18 further comprising means adapted for periodically enabling operation of the garbage collection means.

20. The computer readable medium of instructions for object-to-object mapping between an operating environment and native processor language of claim 19 wherein the means for periodically enabling operation of the garbage collection means is periodically enabled on a pre-selected iteration.

21. The computer readable medium of instructions for object-to-object mapping between an operating environment and native processor language of claim 17 wherein the associated native side identification data includes an object pointer.

22. A computer implemented method for object-to-object mapping between an operating environment and native processor language comprising the steps of:

storing, in a first memory portion of a memory, an application inclusive of at least one application side object description, which at least one object description is compatible computer language associated with the application, wherein each application side object includes associated application side identification data;

storing, in a second memory portion of the memory, executable code in a format native to a selected processor, which executable code includes at least one native side object description, wherein each native side object description includes associated native side identification data;

mapping, by means of an object map, between the at least one application side object description and the native side object description, the object map including means adapted for associating application side identification data with native side identification data;

identifying a class associated with the at least one application side object description and the at least one native side object description;

testing the object map to determine whether a particular pointer is associated with a key data component;

mapping between a selected application side object description and a selected native side object description in accordance with an output of the testing means;

generating updated key data in accordance with an output of the mapping means;

loading a native class factory for instantiation of objects associated with an identified class; and completing access to an object via the object map without translation between the application side and the native side.

23. The computer implemented method for object-to-object mapping between an operating environment and native processor language of claim 22, further comprising the steps of:

determining a presence of the at least one application side object; and initiating the class loader in accordance with a determined presence of the at least one application side object.

24. The computer implemented method for object-to-object mapping between an operating environment and native processor language of claim 23, further comprising the steps of:

testing whether a class factory is still required after a load thereof; and selectively unloading a native class factory in accordance with an output of the testing.

25. The computer implemented method for object-to-object mapping between an operating environment and native processor language of claim 23, further comprising the steps of:

testing whether a native side object description is out of a pre-selected scope; and removing, by means of a garbage collection means, references to a native side object in accordance with an output of the testing.

26. The computer implemented method for object-to-object mapping between an operating environment and native processor language of claim 25 further comprising the step of periodically enabling operation of the garbage collection means.

27. The computer implemented method for object-to-object mapping between an operating environment and native processor language of claim 26 wherein the step of periodically enabling operation of the garbage collection means is periodically enabled on a pre-selected iteration.

28. The computer implemented method for object-to-object mapping between an operating environment and native processor language of claim 24 wherein the associated native side identification data includes an object pointer.

* * * * *